United States Patent
Gaspar et al.

(10) Patent No.: US 11,577,569 B2
(45) Date of Patent: Feb. 14, 2023

(54) BUSHING SNUBBER BRACKET

(71) Applicant: The Pullman Company, Milan, OH (US)

(72) Inventors: Zoren E. Gaspar, Huron, OH (US); Russell E. Butler, Milan, OH (US)

(73) Assignee: The Pullman Company, Milan, OH (US)

( * ) Notice: Subject to any disclaimer, the term of this patent is extended or adjusted under 35 U.S.C. 154(b) by 288 days.

(21) Appl. No.: 17/089,010

(22) Filed: Nov. 4, 2020

(65) Prior Publication Data

US 2022/0134824 A1 May 5, 2022

(51) Int. Cl.
*B60G 7/00* (2006.01)

(52) U.S. Cl.
CPC .......... *B60G 7/001* (2013.01); *B60G 2204/41* (2013.01); *B60G 2206/73* (2013.01)

(58) Field of Classification Search
CPC ............... B60G 7/001; B60G 2204/41; B60G 2206/73; B60G 2204/4102
See application file for complete search history.

(56) References Cited

U.S. PATENT DOCUMENTS

| | | | | |
|---|---|---|---|---|
| RE17,136 E | * | 11/1928 | Harris | B60G 11/12 267/269 |
| 3,642,268 A | * | 2/1972 | Hipsher | F16F 1/387 267/281 |
| 5,122,011 A | | 6/1992 | Missig | |
| 7,090,208 B1 | | 8/2006 | Kiddle | |
| 7,497,310 B2 | * | 3/2009 | Wolf | F16D 27/112 192/84.21 |
| 7,789,405 B2 | * | 9/2010 | Lie | B60G 9/00 267/293 |
| 8,037,573 B2 | * | 10/2011 | Bost, Jr. | F16F 1/393 16/2.2 |
| 8,226,100 B2 | | 7/2012 | Rodecker et al. | |
| 8,505,940 B1 | * | 8/2013 | Hufnagle | B60G 21/0551 280/124.152 |
| 10,704,637 B2 | | 7/2020 | Zimmerman et al. | |
| 2004/0207135 A1 | * | 10/2004 | Joseph | B60G 21/0551 267/141.1 |
| 2015/0035246 A1 | * | 2/2015 | Noble | B60G 7/008 280/124.13 |
| 2016/0159182 A1 | | 6/2016 | Cerri, III et al. | |
| 2018/0135716 A1 | * | 5/2018 | Zimmerman | F16F 1/3842 |
| 2018/0245654 A1 | * | 8/2018 | Akiyama | F16F 1/3842 |
| 2018/0361811 A1 | | 12/2018 | Chua et al. | |
| 2020/0063821 A1 | * | 2/2020 | Ramm | F16F 9/30 |

* cited by examiner

*Primary Examiner* — Darlene P Condra

(74) *Attorney, Agent, or Firm* — Harness, Dickey & Pierce, P.L.C.

(57) ABSTRACT

An elastomeric bushing assembly includes an outer sleeve, a bar pin, an elastomeric bushing and a monolithic, one-piece bracket. The bar pin includes first and second opposing ends. The elastomeric bushing is disposed between the outer sleeve and the bar pin. The bracket includes a body defining a cavity and a flange. The flange radially extends from an end of the body and circumferentially extends substantially 360 degrees. One of the first and second ends of the bar pin is securely received in the cavity of the body.

20 Claims, 8 Drawing Sheets

BUSHING SNUBBER BRACKET

FIELD

The present disclosure relates to an elastomeric bushing assembly having a snubber bracket.

BACKGROUND

This section provides background information related to the present disclosure and is not necessarily prior art.

Vehicles include front and rear suspension systems to connect the chassis of the vehicle (the unsprung portion) and the body of the vehicle (the sprung portion). The suspension systems normally include an upper control arm, a lower control arm and a hub or knuckle which supports the tire of the vehicle. Each control arm is attached to the frame or other structural component of the vehicle using one or more elastomeric bushing assemblies. Each elastomeric bushing assembly usually consists of an outer metal tube which is pressed into the control arm, a layer of elastomer positioned within the outer metal housing and an inner metal housing which extends through the center of the layer of elastomer. The inner metal housing is attached to a bracket on the frame, the supporting structure or the sprung portion of the vehicle or a bolt extends through the inner metal and secures the end of the control arm to the frame, the supporting structure or the sprung portion of the vehicle by mating with an appropriate bracket. As the vehicle travels, relative movement between the sprung and unsprung portions of the vehicle is accommodated by flexing of a coil spring, a torsion bar, an air spring or by another resilient device. The flexing of the resilient device causes the ends of the control arms to pivot on both of the pivot bushings which secure the control arms to the sprung portion of the vehicle.

The elastomeric bushing assemblies are used to facilitate this pivotal motion and to isolate the vehicle from shock. The layer of elastomer located between the inner and outer metal housings effectively isolates the sprung portion of the vehicle from the unsprung portion of the vehicle. In certain applications, the elastomeric bushing assemblies may include a bracket that is attached to an end of the inner metal and is configured to engage the elastomer during a loaded condition to limit relative movement between the inner metal and the outer metal tube. Some brackets attached to the inner metal are formed of a two-piece construction that requires welding, thus, complicating manufacturing of the elastomeric bushing assemblies and increasing manufacturing costs. Other brackets attached to the inner metal only contact half of the elastomer during the loaded condition which limits the load carry capacity of the elastomeric bushing assemblies.

Thus, the present disclosure provides an elastomeric bushing assembly including a monolithic, one-piece bracket that simplifies manufacturing and reduces manufacturing cost. Furthermore, the bracket engages the elastomer substantially 360 degrees around the elastomer which increases the load carry capacity of the elastomeric bushing assembly.

SUMMARY

This section provides a general summary of the disclosure, and is not a comprehensive disclosure of its full scope or all of its features.

In one form, the present disclosure discloses an elastomeric bushing assembly that includes an outer sleeve, a bar pin, an elastomeric bushing and a monolithic, one-piece bracket. The bar pin includes first and second opposing ends. The elastomeric bushing is disposed between the outer sleeve and the bar pin. The bracket includes a body that defines a cavity and a flange. The flange radially extends from an end of the body and circumferentially extends substantially 360 degrees. One of the first and second ends of the bar pin is securely received in the cavity of the body.

In some configurations of the elastomeric bushing assembly of the above paragraph, the elastomeric bushing includes an end having a snubber. The flange includes a surface spaced apart from the snubber when the elastomeric bushing assembly is in an unloaded condition. The snubber engages the surface of the flange during a loaded condition to limit the amount of relative travel between the bar pin and the outer sleeve.

In some configurations of the elastomeric bushing assembly of any one or more of the above paragraphs, the outer sleeve includes a body and a flange that extends radially outwardly from an end of the body. The snubber is coupled to the flange of the outer sleeve.

In some configurations of the elastomeric bushing assembly of any one or more of the above paragraphs, the snubber is externally located relative to the outer sleeve.

In some configurations of the elastomeric bushing assembly of any one or more of the above paragraphs, the bracket comprises a metal sheet including a constant thickness.

In some configurations of the elastomeric bushing assembly of any one or more of the above paragraphs, the flange has a diameter that is larger than a diameter of the elastomeric bushing.

In another form, the present disclosure discloses an elastomeric bushing assembly that includes an outer sleeve, a bar pin, an elastomeric bushing, and a monolithic, one-piece bracket. The bar pin includes first and second opposing ends. The elastomeric bushing is disposed between the outer sleeve and the bar pin. The body is U-shaped and includes a first leg spaced apart from a second leg. The first and second legs being interconnected by an end wall. The bracket further includes a first flange radially extending from the first leg and a second flange radially extending from the second leg. The first and second flanges being coplanar. One of the first and second ends of the bar pin is positioned between the first and second legs and secured to the body.

In some configurations of the elastomeric bushing assembly of the above paragraph, the body includes a first retention member that extends from a first side of the first leg toward the second leg and a second retention member that extends from a second side of the first leg toward the second leg.

In some configurations of the elastomeric bushing assembly of any one or more of the above paragraphs, the first and second retention members are arcuate.

In some configurations of the elastomeric bushing assembly of any one or more of the above paragraphs, the first and second retention members are attached to the first end of the bar pin by crimping.

In some configurations of the elastomeric bushing assembly of any one or more of the above paragraphs, the first and second retention members extend at least partially around opposing lateral sides of the first end of the bar pin.

In some configurations of the elastomeric bushing assembly of any one or more of the above paragraphs, the first and second retention members are spaced apart from the second leg.

In some configurations of the elastomeric bushing assembly of any one or more of the above paragraphs, the first and second retention members are attached to the first end of the bar pin by snap fit.

In some configurations of the elastomeric bushing assembly of any one or more of the above paragraphs, the first retention member includes a first protrusion that extends therefrom and the second retention member includes a second protrusion that extends therefrom. The first and second protrusions extend toward each other.

In some configurations of the elastomeric bushing assembly of any one or more of the above paragraphs, the first end of the bar pin includes first and second lateral sides having first and second grooves, respectively. The first protrusion is received in the first groove and the second protrusion is received in the second groove to couple the bracket and the bar pin to each other.

In some configurations of the elastomeric bushing assembly of any one or more of the above paragraphs, the body includes a third retention member that extends from a first side of the second leg toward the first retention member and a fourth retention member that extends from a second side of the second leg toward the second retention member.

In some configurations of the elastomeric bushing assembly of any one or more of the above paragraphs, the third retention member includes a third protrusion extending therefrom and the fourth retention member includes a fourth protrusion extending therefrom. The third retention member is received in the first groove and the fourth retention member is received in the second groove to further couple the bracket and the bar pin to each other.

In some configurations of the elastomeric bushing assembly of any one or more of the above paragraphs, the end wall is arcuate.

In some configurations of the elastomeric bushing assembly of any one or more of the above paragraphs, the first and second flanges form a circular shape having a diameter that is larger than a diameter of the elastomeric bushing.

In some configurations of the elastomeric bushing assembly of any one or more of the above paragraphs, the elastomeric bushing includes an end having a snubber. The first and second flanges are spaced apart from the snubber when the elastomeric bushing assembly is in an unloaded condition. The snubber engages the first and second flanges substantially 360 degrees during a loaded condition to limit the amount of relative travel between the bar pin and the outer sleeve.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
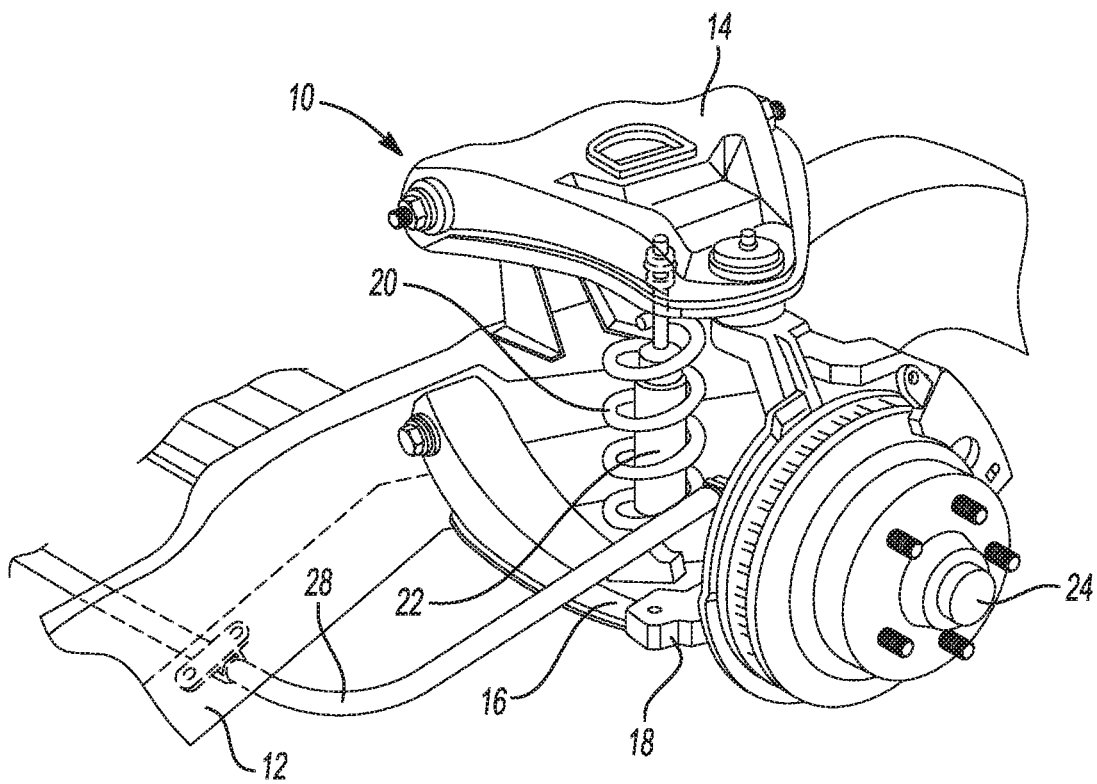
FIG. 1 is a typical suspension for a vehicle which incorporates the elastomeric bushing assembly in accordance with the present disclosure.
Figure 2:
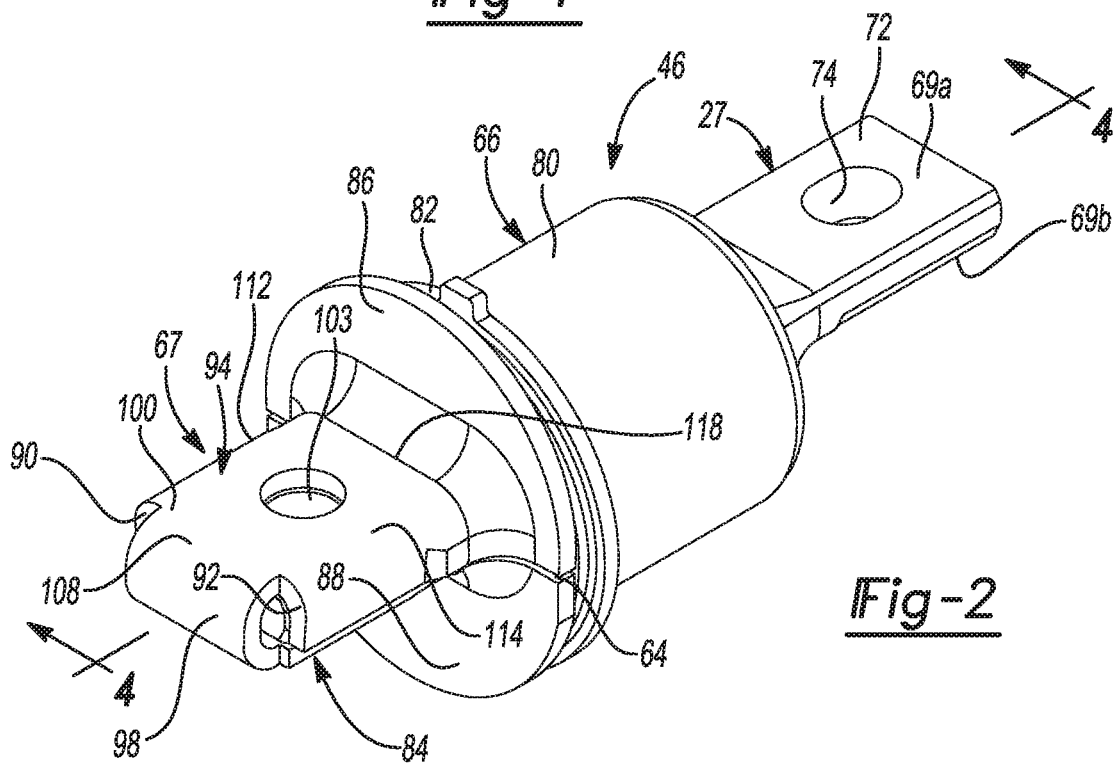
FIG. 2 is a perspective view of the elastomeric bushing assembly.
Figure 3:
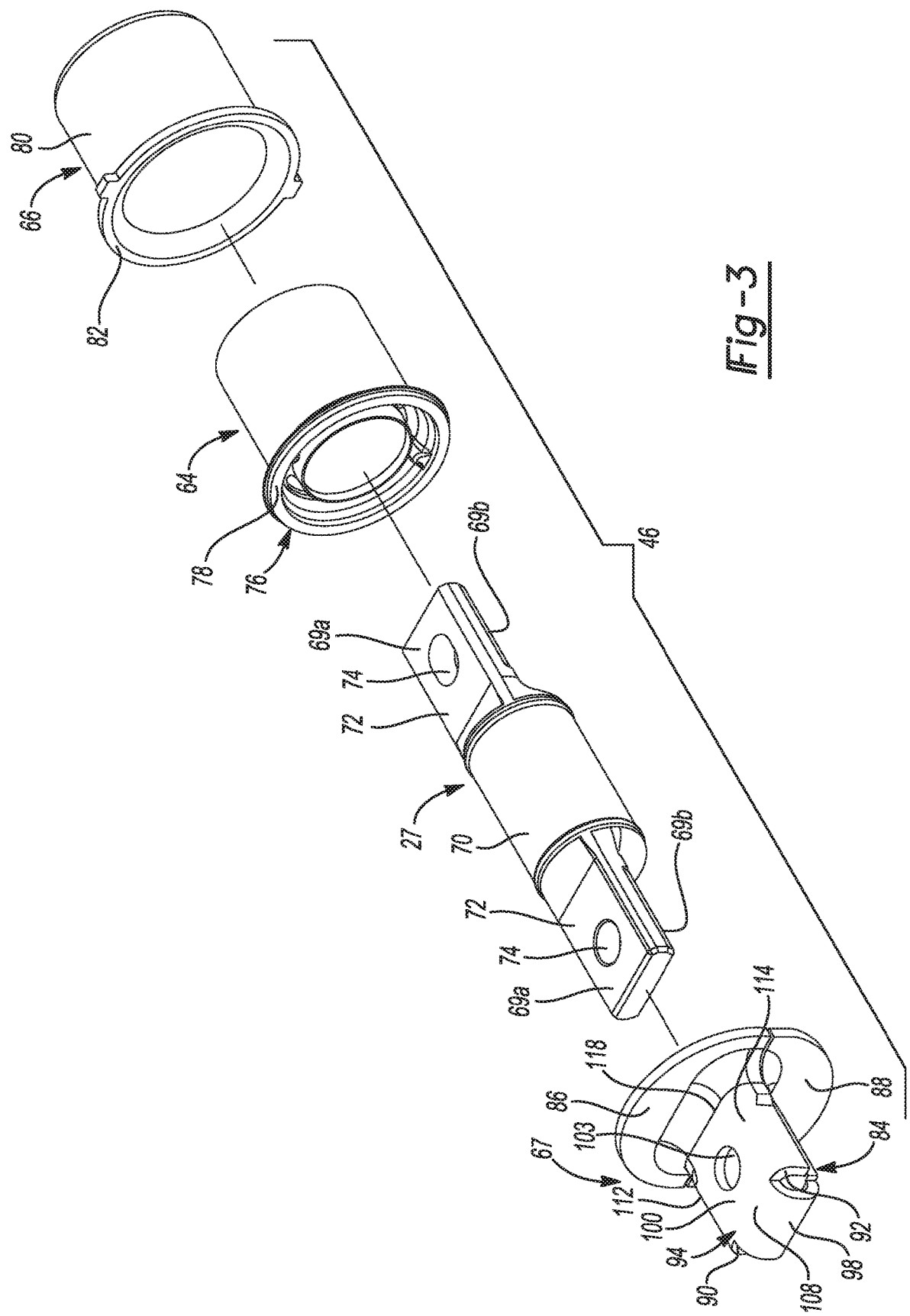
FIG. 3 is an exploded view of the elastomeric bushing assembly.

Referring now to the drawings in which like reference numerals designate like or corresponding parts throughout the several views, there is illustrated in FIG. 1, a truck, bus or highly loaded suspension system incorporating the elastomeric bushing in accordance with the present disclosure and which is designated generally by reference numeral 10. Suspension system 10 comprises a frame or supporting structure of the vehicle 12, an upper control arm 14, a lower control arm 16, a hub or knuckle 18, a coil spring 20, a shock absorber 22 and a wheel end assembly 24. The frame or supporting structure 12 supports a body (not shown) and other components of the vehicle which are generally identified as the "sprung mass". The wheel end assembly 24 may or may not be drivingly attached to a differential or a transaxle (not shown) which receives torque from an engine (not shown). The coil spring 20 supports the load for the sprung portion of the vehicle and the shock absorber 22 dampens the movement of the wheel with respect to the frame or supporting structure 12. A torque rod or anti-roll bar 28 can be disposed between the frame or supporting structure 12 and the hub or knuckle 18 to assist in the control of the wheel with respect to the frame or supporting structure 12.

With reference to FIGS. 1-6, the upper control arm 14 and the lower control arm 16 are each attached to the frame or supporting structure 12 using a pair of elastomeric bushing assemblies 46. Each elastomeric bushing assembly 46 is disposed between the control arms 14 and 16 and the frame or supporting structure 12 to accommodate the motion between these two components and to isolate the sprung portion of the vehicle from shock.

While the present disclosure is illustrated as having two elastomeric bushing assemblies 46 disposed between the upper control arm 14 and the frame or supporting structure 12 and one elastomeric bushing assembly 46 disposed between the lower control arm 16 and the frame or supporting structure 12, it is within the scope of the present disclosure to utilize the elastomeric bushing assembly 46 between any two components that require one of the components to pivot with respect to the other component. In addition, while the present disclosure is described as having three identical elastomeric bushing assemblies 46 disposed between the control arms 14 and 16 and the frame or supporting structure 12, it is within the scope of the present disclosure to utilize a different design for each elastomeric bushing assembly 46. Also, while the present disclosure is being illustrated in conjunction with an independent suspension system, it is within the scope of the present disclosure to utilize the elastomeric bushing assembly 46 in other suspension designs including, but not limited to, leaf spring suspension systems.

With reference to FIGS. 2-8, each elastomeric bushing assembly 46 comprises an inner component 27 (FIGS. 2-7), an elastomeric bushing 64 (FIGS. 2-5), an outer sleeve or component 66 (FIGS. 2-5), and a monolithic, one-piece bracket 67 (FIGS. 2-6 and 8). The inner component 27 is illustrated as a metal bar pin which includes a generally cylindrical center section 70 and a pair of generally rectangular end sections 72, one generally rectangular end section 72 being disposed at each end of cylindrical center section 70. The center section 70 is disposed within the elastomeric bushing 64 and the outer sleeve 66. Each rectangular end section 72 has an aperture 74 extending through it which is used to secure elastomeric bushing assembly 46 to the appropriate bracket 67. Aperture 74 extends from a first flat side 69a of the end section 72 to a second flat side 69b that is opposite the first flat side 69a. While inner component 27 is illustrated as a bar pin having a generally cylindrical center section 70, it is within the scope of the present disclosure to have different inner components including but not limited to an inner component having a generally spherical center section, a tubular inner component or any other type of inner component.

Figure 4:
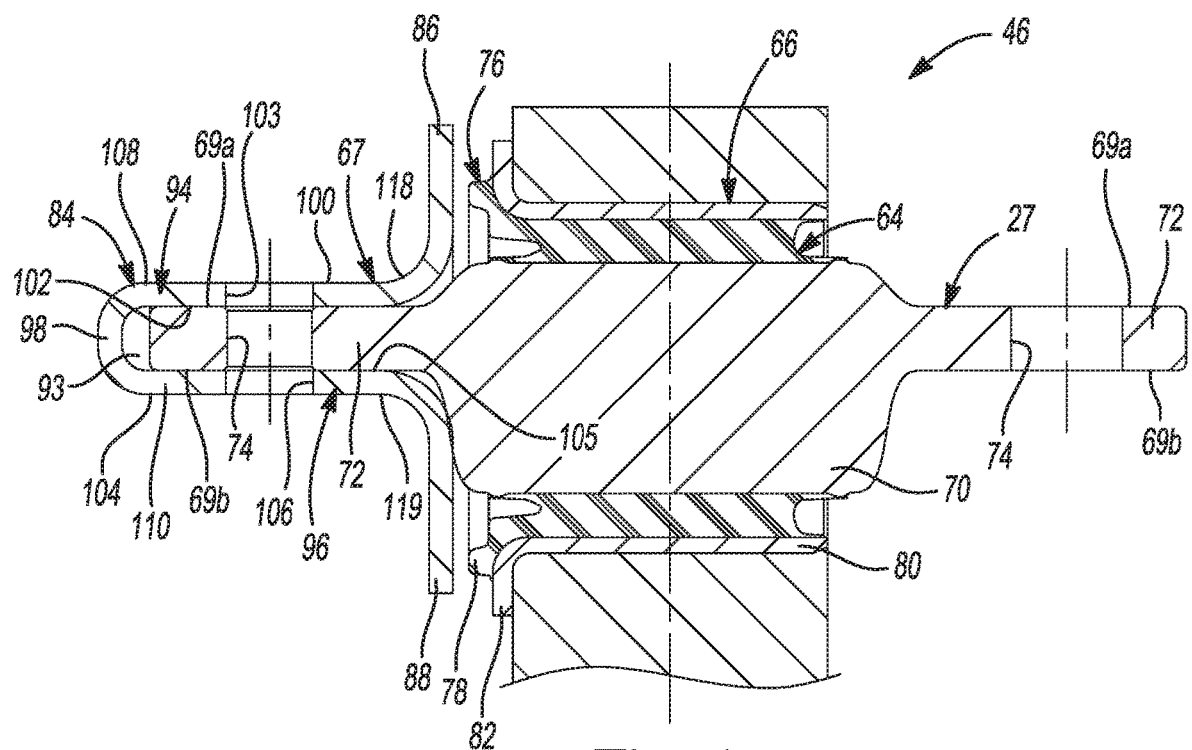
FIG. 4 is a cross-sectional view of the elastomeric bushing assembly taken along line 4-4 in FIG. 2 in a unloaded condition.
Figure 5:
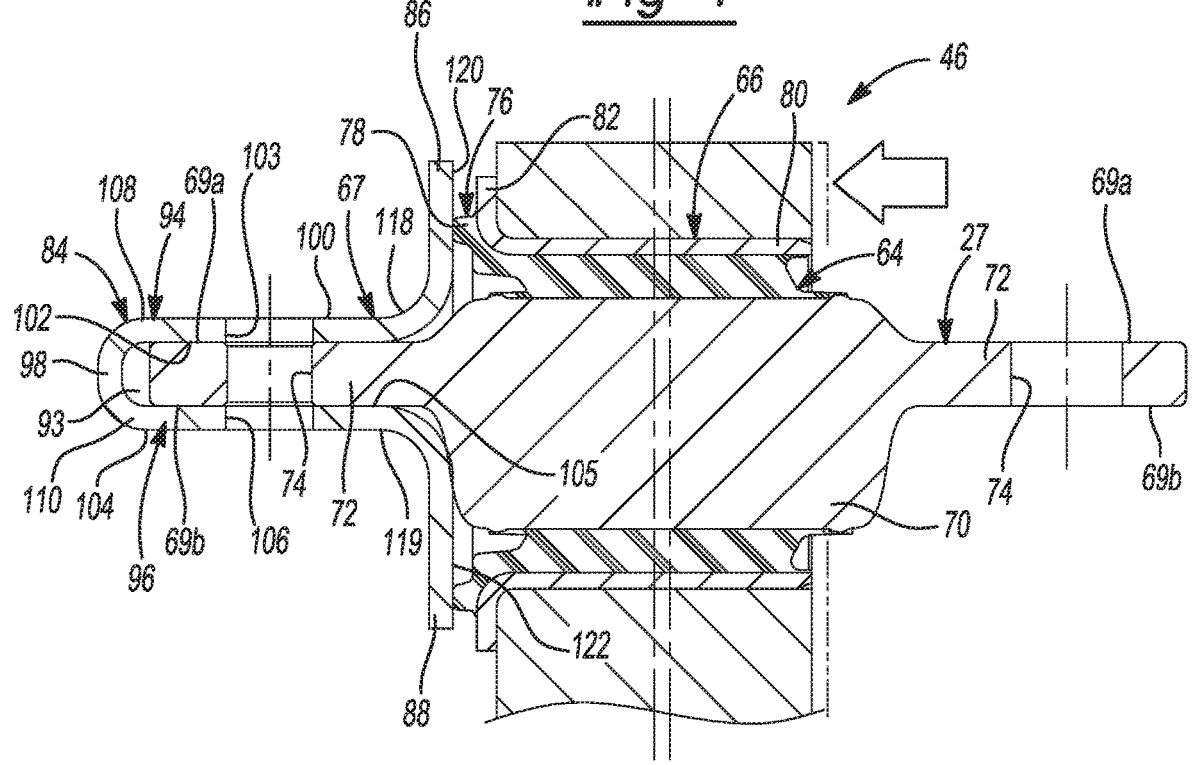
FIG. 5 is a cross-sectional view of the elastomeric bushing assembly illustrated in a loaded condition.

As shown in FIGS. 4 and 5, the elastomeric bushing 64 is an elastomeric annular member located between the inner component 60 and the outer component 66. The free diameter of the elastomeric bushing 64 is larger than the space between the inner component 27 and the outer component 66 such that a specified percent compression is applied to the elastomeric bushing 64 when it is assembled into elastomeric bushing assembly 46. The assembly of the elastomeric bushing 64 is accomplished by first bonding the elastomeric bushing 64 to the outer component 66 and then bonding the elastomeric bushing 64 to the inner component 27. While the elastomeric bushing 64 is described as being bonded to both the outer component 66 and the inner component 27, it is within the scope of the present disclosure to bond the elastomeric bushing 64 to the inner component 27 and rely on a mechanical bond between the elastomeric bushing 64 and the outer component 66.

A snubber or flange 76 may extend radially outwardly from an end of the elastomeric bushing 64 and may be located externally relative to the outer sleeve 66 (located outside of the outer sleeve 66). The snubber 76 may include a projection or bumper 78. The bumper 78 may extend in an axial direction from the snubber 76 and may extend circumferentially 360 degrees around a periphery of the snubber 76.

The outer component 66 is a metal cylindrical tube which is bonded to the elastomeric bushing 64. The outer component 66 includes a body 80 and a flange 82. The flange 82 may extend radially outwardly from an end of the body 80 and may be bonded to the snubber 76 of the elastomeric bushing 64.

The bracket 67 is fixed to one of the end sections 72 of the inner component 27 and may be manufactured from a single piece of stamped material, preferably metal having a constant thickness. With reference to FIGS. 2-6 and 8, the bracket 67 may include a body 84, a first flange 86, a second flange 88, a first retention member 90 (FIGS. 2, 3, 6, and 8), and a second retention member 92 (FIGS. 2, 3, 6, and 8). The body 84 may be U-shaped and may define a cavity 93 (FIGS. 4 and 5) that one of the end sections 72 of the inner component 27 is securely received in.

The body 84 may also include a first leg 94, a second leg 96, and an arcuate end wall 98 that interconnects the first leg 94 and the second leg 96 to each other. The first leg 94 may be spaced apart from and parallel to the second leg 96, and may include an outer flat surface 100, an inner flat surface 102 opposite the outer flat surface 100, and an aperture 103 (the aperture 103 extends from the outer flat surface 100 to the inner flat surface 102). The second leg 96 may include an outer flat surface 104, an inner flat surface 105 opposite the outer flat surface 104, and an aperture 106 (the aperture 106 extends from the outer flat surface 104 to the inner flat surface 105). Once the end section 72 of the inner component 27 is received in the cavity 93, the first flat side 69a of the end section 72 contacts the inner flat surface 102 of the first leg 94 and the second flat side 69b of the end section 72 contacts the inner flat surface 105 of the second leg 96. The aperture 103 may be aligned with the aperture 106 of the second leg 96 and the aperture 74 of the end section 72 received in the cavity 93. In this way, a fastener (not shown) may extend through the apertures 74, 103, 106, and a vehicle subframe, thereby coupling the inner component 27 and the bracket 67 to the vehicle subframe. The end wall 98 extends from a first end 108 of the first leg 94 to a first end 110 of the second leg 96.

Figure 6:
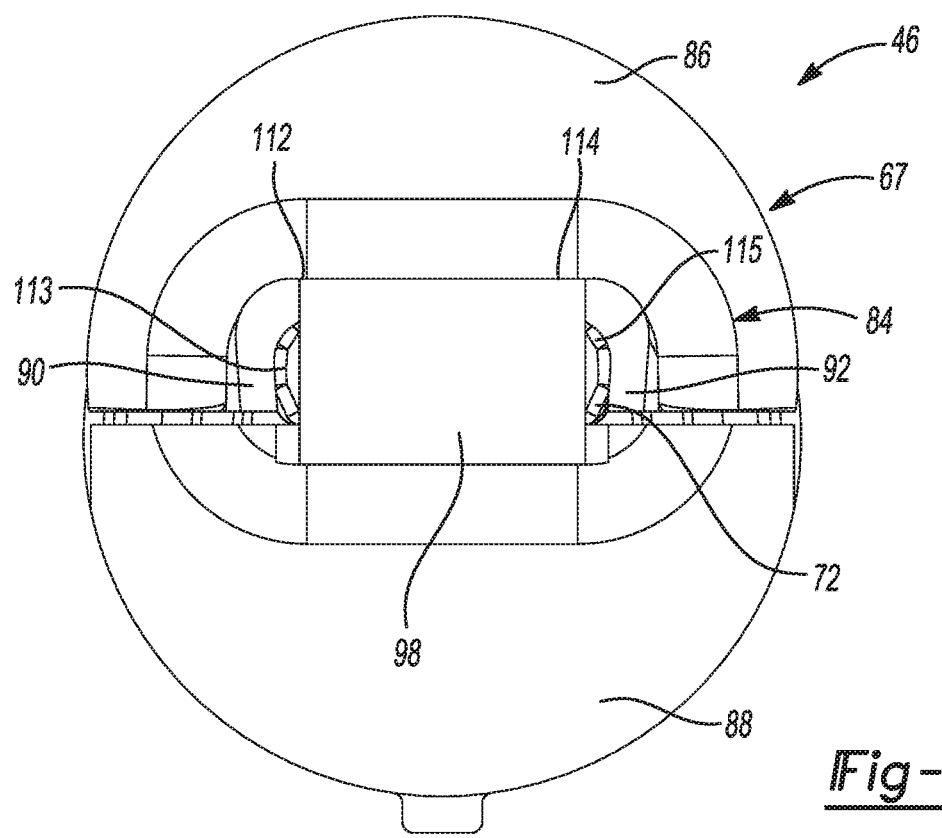
FIG. 6 is an end view of a monolithic, one-piece snubber bracket and a bar pin of the elastomeric bushing assembly.
Figure 7:
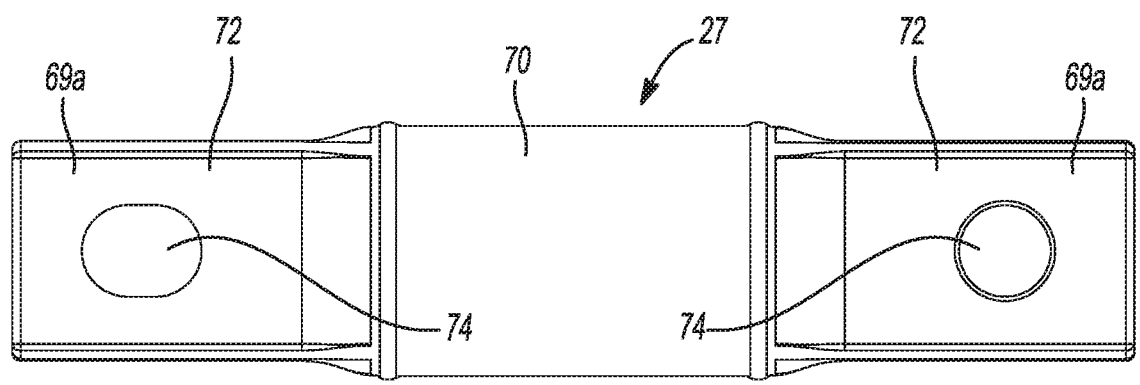
FIG. 7 is a side view of the bar pin of the elastomeric bushing assembly of FIG. 2.
Figure 8:
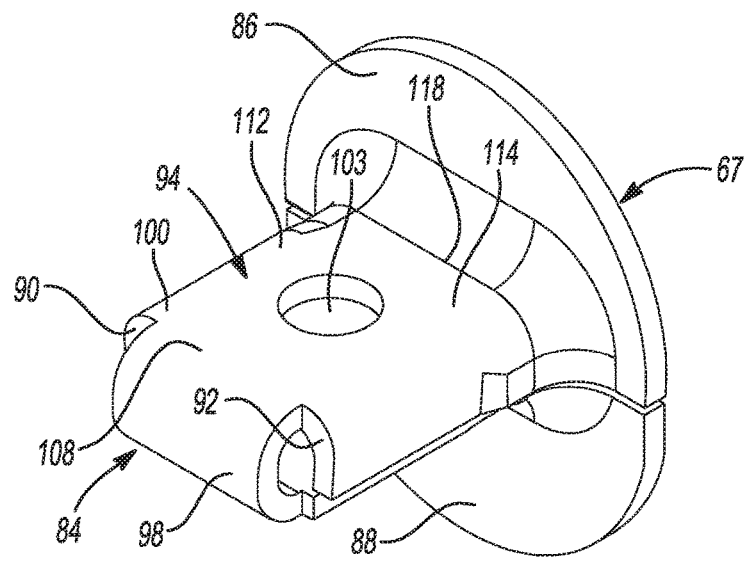
FIG. 8 is a perspective view of the snubber bracket.

The first retention member 90 is arcuate and extends from a first side 112 of the first leg 94 toward the second leg 96 (the first retention member 90 is spaced apart from the second leg 96). As best shown in FIG. 6, the first retention member 90 may also extend at least partially around a first lateral side 113 of the end section 72 of the inner component 27. The second retention member 92 is arcuate and extends from a second side 114 of the first leg 94 that is opposite the first side 112 toward the second leg 96 (the second retention member 92 is spaced apart from the second leg 96). The second retention member 92 may also extend at least partially around a second lateral side 115 of the end section 72 of the inner component 27. Once the end section 72 of the inner component 27 is received in the cavity 93 of the body 84, the first and second retention members 90, 92 maybe attached to the end section 72 by a crimping process or any other forming process, thereby fixing the inner component 27 and the bracket 67 to each other.

The first flange 86 extends radially outwardly from a second end 118 of the first leg 94 and may have a semi-circular shape. The second flange 88 extends radially outwardly from a second end 119 of the second leg 96 and may have a semi-circular shape. The first and second flanges 86, 88 may be coplanar with each other and may be spaced apart from each other. The first and second flanges 86, 88 may also form a circular shape having a diameter that is greater than a diameter of the outer sleeve 66. In this way, when the elastomeric bushing assembly 46 is in a loaded condition (FIG. 5), first and second surfaces 120, 122 of the first and second flanges 86, 88, respectively, engage the bumper 78 of the snubber 76 to limit the amount of relative travel between the inner component 27 and the outer sleeve 66. When the elastomeric bushing assembly 46 is in an unloaded condition (FIG. 4), the first and second surfaces 120, 122 are spaced apart from the bumper 78.

One of the advantages of the elastomeric bushing assembly 46 of the present disclosure is that the bumper 78 contacts the bracket 67 substantially 360 degrees around the bracket 67, which increases the load carrying capacity of the bushing assembly 46.

With continued reference to FIGS. 9-14, another elastomeric bushing assembly 246 is provided. The structure and function of the elastomeric bushing assembly 246 may be similar or identical to that of elastomeric bushing assembly 46, apart from the exceptions described below.

The elastomeric bushing assembly 246 comprises an inner component 260 (FIGS. 9-13), an elastomeric bushing 264 (FIGS. 9-13), an outer sleeve or component 266 (FIGS. 9-13), and a monolithic, one-piece bracket 267. The inner component 260 is illustrated as a metal bar pin which includes a generally cylindrical center section 270 and a pair of generally rectangular end sections 272, one generally rectangular end section 272 being disposed at each end of cylindrical center section 270. The center section 270 is disposed within the elastomeric bushing 264 and the outer sleeve 266. Each rectangular end section 272 has an aperture 274 extending through it which is used to secure elastomeric bushing assembly 246 to the appropriate bracket (the aperture 274 extends from a first flat side 269a of the end section 272 to a second flat side 269b that is opposite the first flat side 269a). Each rectangular end section 272 also includes opposing lateral sides 275. Each lateral side 275 may have a groove 277 formed therein.

The elastomeric bushing 264 is an elastomeric annular member which is located between the inner component 260 and the outer component 266. A snubber or flange 276 may extend radially outwardly from an end of the elastomeric bushing 264 and may be located externally relative to the outer sleeve 266. A plurality of arcuate projections or bumpers 278 may be circumferentially spaced apart substantially 360 degrees around a periphery of the snubber 276.

The outer component 266 is a metal cylindrical tube which is bonded to the elastomeric bushing 264. The outer component 266 includes a body 280 and a flange 282. The flange 282 may extend radially outwardly from an end of the body 280 and may be bonded to the snubber 276 of the elastomeric bushing 264.

The bracket 267 is attached to one of the end sections 272 of the inner component 260 via snap fitting. With reference to FIGS. 9-14, the bracket 267 may include a body 284, a first flange 286, a second flange 288, and a plurality of retention members (290a, 290b, 290c, 290d). The body 284 maybe U-shaped and may define a cavity 293 that one of the end sections 272 of the inner component 260 is securely received in.

Figure 12:
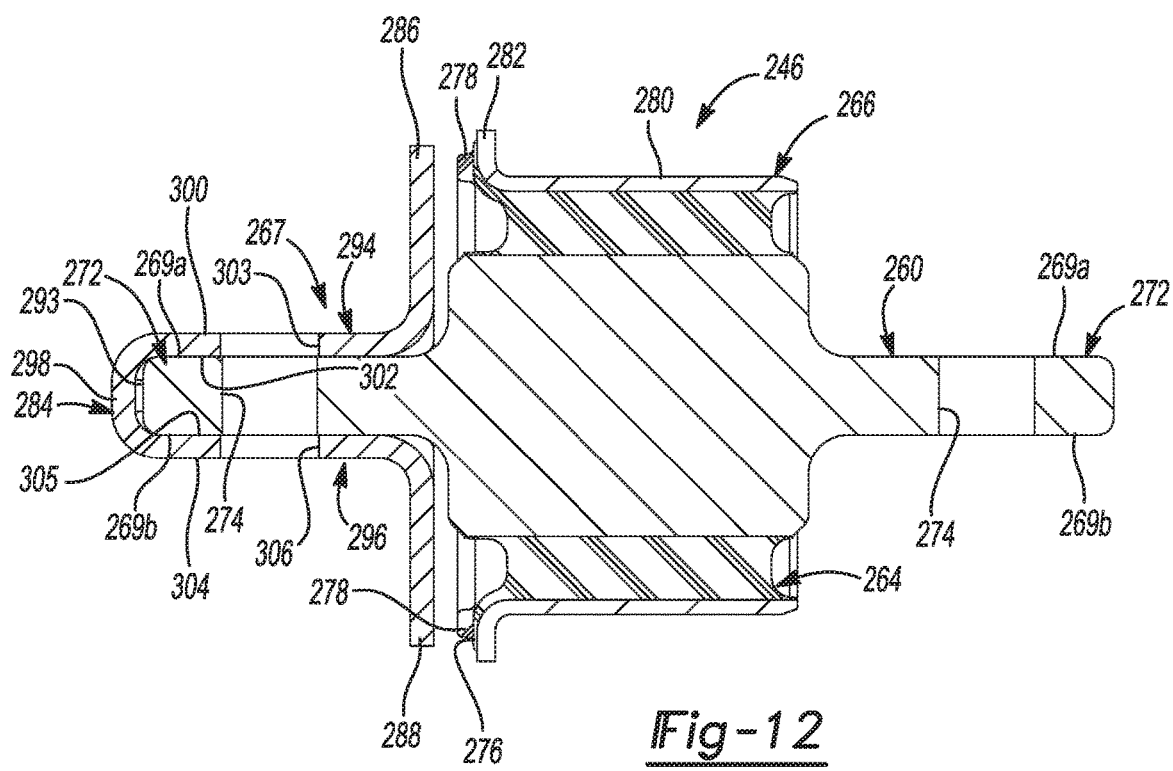
FIG. 12 is a cross-sectional view of the elastomeric bushing assembly taken along line 12-12 in FIG. 9.
Figure 13:
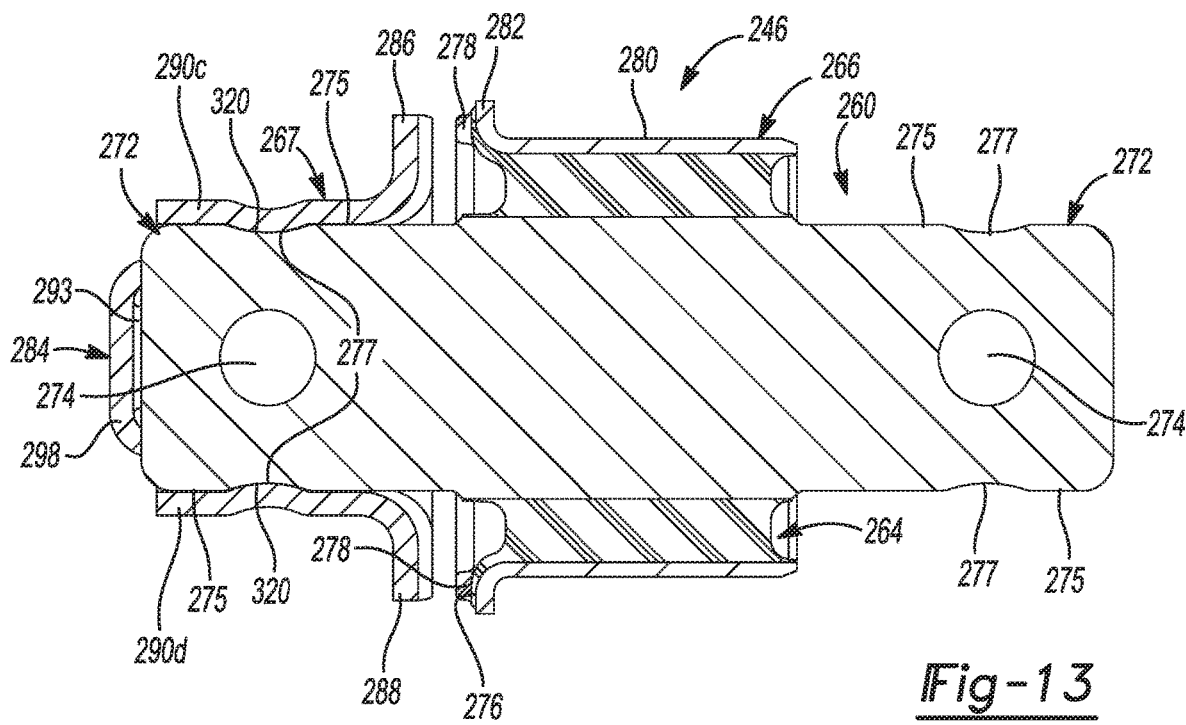
FIG. 13 is another cross-sectional view of the elastomeric bushing assembly in FIG. 9.

The body 284 may also include a first leg 294, a second leg 296, and an end wall 298 that interconnects the first leg 294 and the second leg 296 to each other. The first leg 294 maybe spaced apart from and parallel to the second leg 296, and may include an outer flat surface 300 (FIGS. 9, 10, 12, and 14), an inner flat surface 302 (FIGS. 9, 10, 12, and 14) opposite the outer flat surface 300, and an aperture 303 (FIG. 12). The second leg 296 may include an outer flat surface 304 (FIGS. 9, 10, 12, and 14), an inner flat surface 305 (FIGS. 9, 10, 12, and 14) opposite the outer flat surface 304, and an aperture 306 (FIGS. 9, 10, 12, and 14). As shown in FIG. 12, the aperture 303 may be aligned with the aperture 306 of the second leg 296 and the aperture 274 of the end section 272 received in the cavity 293. In this way, a fastener (not shown) may extend through the apertures 274, 303, 306, and a vehicle subframe, thereby coupling the inner component 260 and the bracket 267 to the vehicle subframe.

Figure 9:
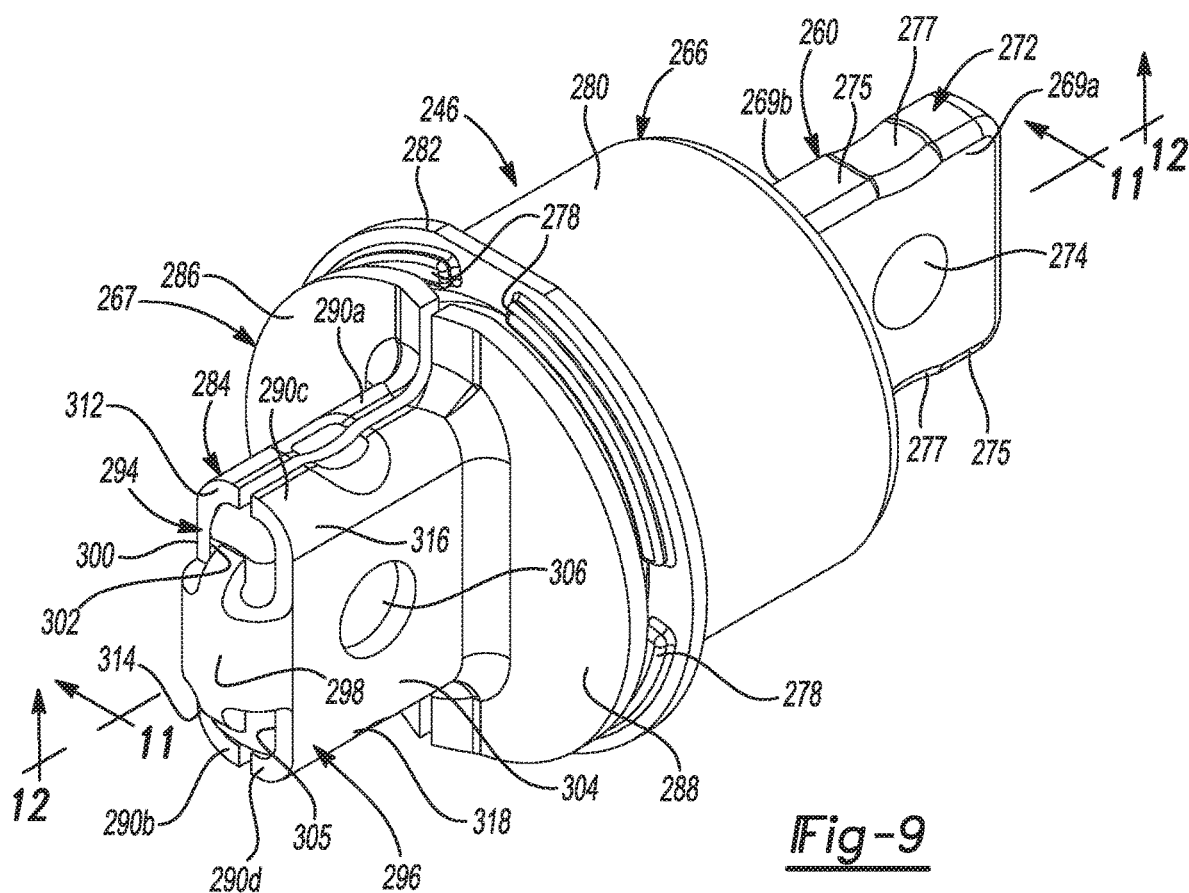
FIG. 9 is a perspective view of an elastomeric bushing assembly in accordance with another embodiment of the present disclosure.
Figure 10:
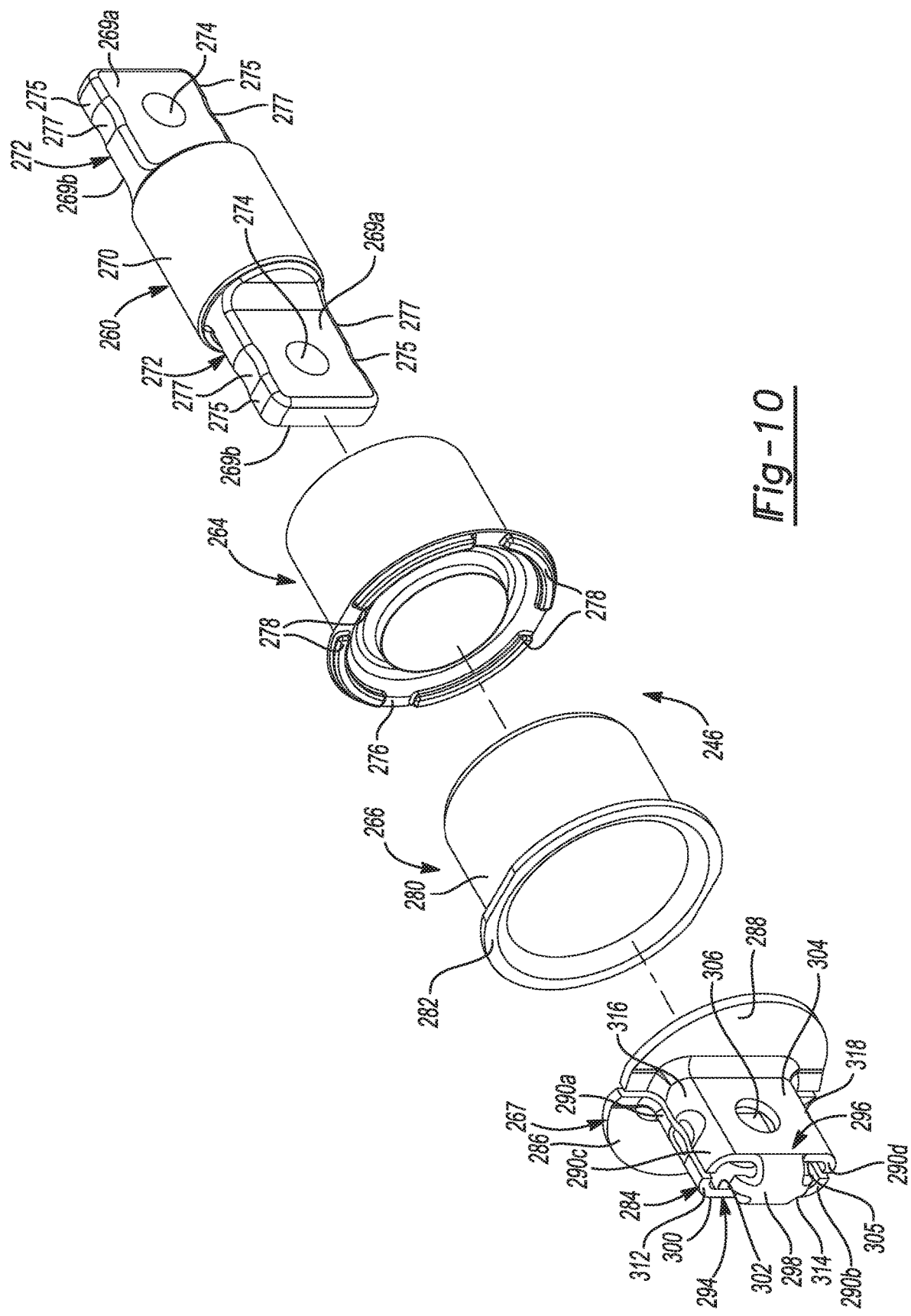
FIG. 10 is an exploded view of the elastomeric bushing assembly of FIG. 9.
Figure 11:
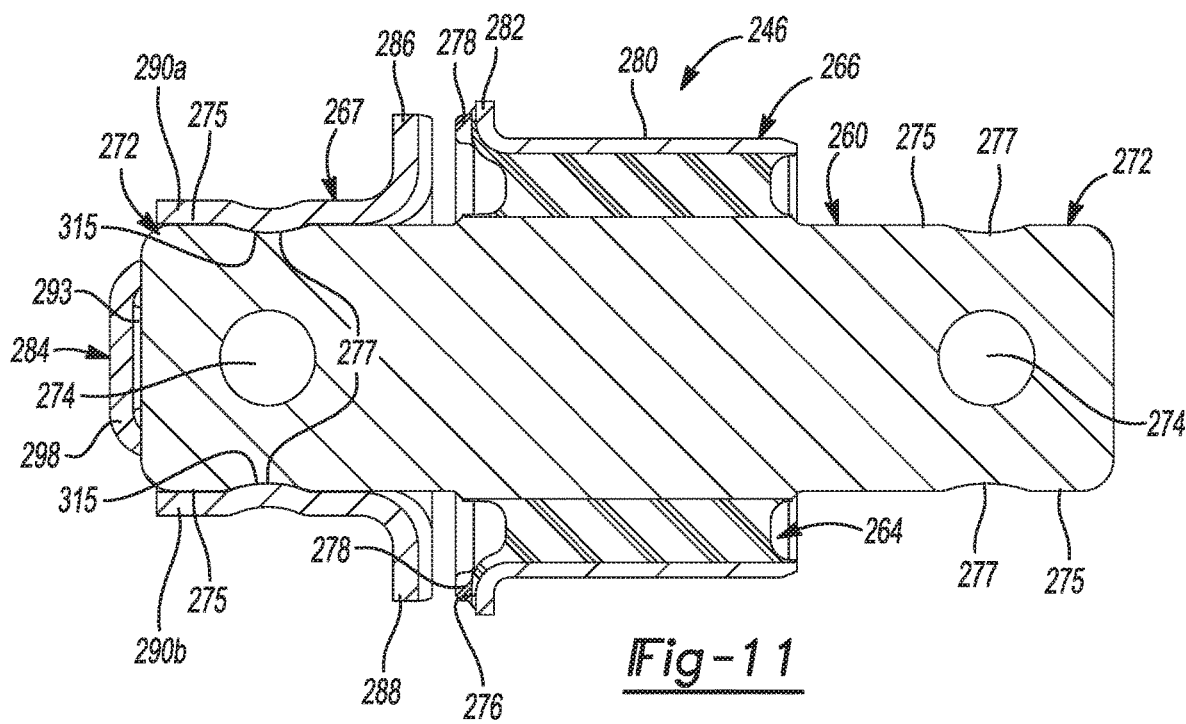
FIG. 11 is a cross-sectional view of the elastomeric bushing assembly taken along line 11-11 in FIG. 9.
Figure 14:
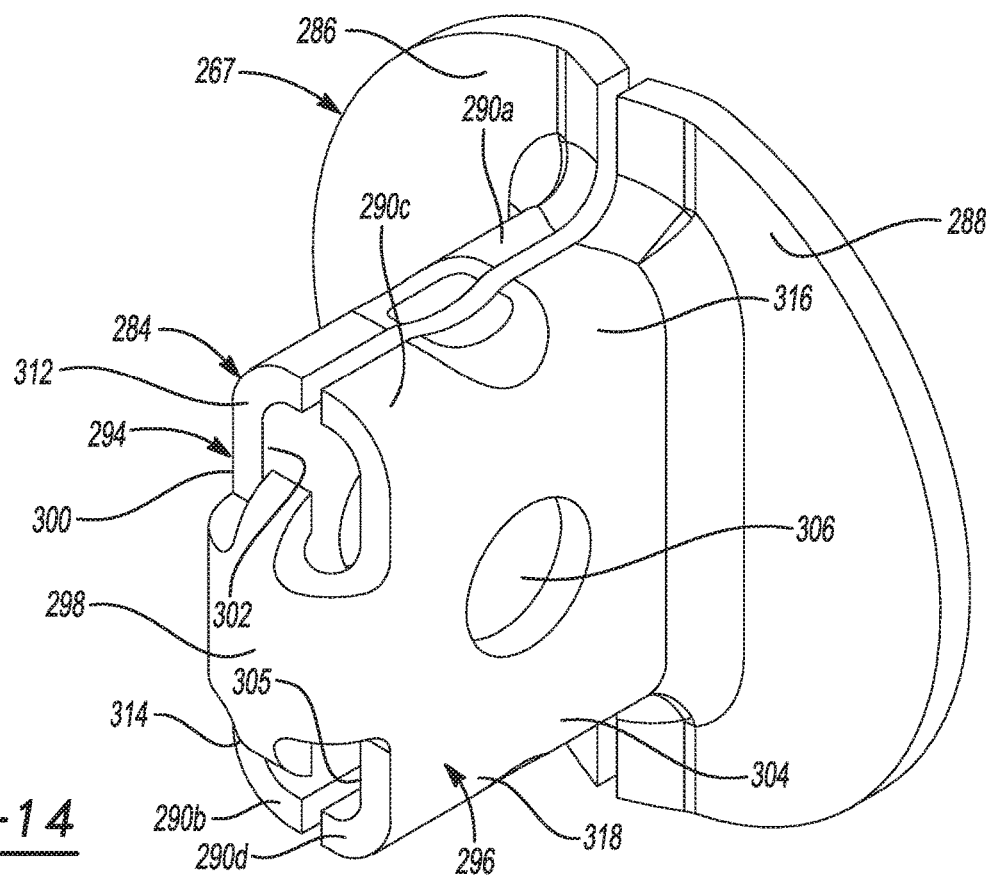
FIG. 14 is a perspective view of a monolithic, one-piece snubber bracket of the elastomeric bushing assembly of FIG. 9.

As shown in FIGS. 9, 10, and 14, the retention member 290a extends from a first side 312 of the first leg 294 and the retention member 290b extends from a second side 314 of the first leg 294 that is opposite the first side 312. Each of the retention members 290a, 290b extends at least partially around corresponding lateral sides 275 of the inner component 260 and includes protrusions 315 (FIG. 11) extending therefrom (the protrusions 315 of the retention members 290a, 290b extend toward each other). The retention member 290c extends from a first side 316 of the second leg 296 and the retention member 290d extends from a second side 318 of the second leg 296 that is opposite the first side 316. Each of the retention members 290c, 290d extends at least partially around corresponding lateral sides 275 of the inner component 260 and includes protrusions 320 (FIG. 13) extending therefrom (the protrusions 320 of the retention members 290a, 290b extend toward each other). The retention members 290a, 290c are spaced apart from each other and the retention members 290b, 290d are spaced apart from each other. Once the end section 272 of the inner component 260 is received in the cavity 293 of the body 284, the protrusions 315, 320 of the retention members 290a, 290c, respectively, are received in one groove 277 of the end section 272, and the protrusions 315, 320 of the retention members 290b, 290d, respectively, are received in the other groove 277 of the end section 272. In this way, the bracket 267 is coupled to the inner component 260.

The first flange 286 extends radially outwardly from the first leg 294 and may have a semi-circular shape. The second flange 288 extends radially outwardly from the second leg 296 and may have a semi-circular shape. The first and second flanges 286, 288 may be coplanar with each other and may be spaced apart from each other. The first and second flanges 286, 288 may also form a circular shape having a diameter.

One of the advantages of the elastomeric bushing assembly 246 of the present disclosure is that the attachment of the bracket 267 and the inner component 260 is simplified. That is, the bracket 267 and the inner component 260 are snap fit to each other without the need for a secondary crimping or forming process.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An elastomeric bushing assembly comprising:
   an outer sleeve;
   a bar pin including first and second opposing ends;
   an elastomeric bushing disposed between the outer sleeve and the bar pin; and
   a monolithic, one-piece bracket including a body defining a cavity and a flange, the flange radially extending from an end of the body and circumferentially extending substantially 360 degrees,
   wherein one of the first and second ends of the bar pin is securely received in the cavity of the body.

2. The bushing assembly of claim 1, wherein the elastomeric bushing includes an end having a snubber, the flange including a surface spaced apart from the snubber when the elastomeric bushing assembly is in an unloaded condition, the snubber engaging the surface of the flange during a loaded condition to limit the amount of relative travel between the bar pin and the outer sleeve.

3. The bushing assembly of claim 2, wherein the outer sleeve includes a body and a flange extending radially outwardly from an end of the body, the snubber coupled to the flange of the outer sleeve.

4. The bushing assembly of claim 2, wherein the snubber is externally located relative to the outer sleeve.

5. The bushing assembly of claim 1, wherein the bracket comprises a metal sheet including a constant thickness.

6. The bushing assembly of claim 1, wherein the flange has a diameter that is greater than a diameter of the elastomeric bushing.

7. An elastomeric bushing assembly comprising:
   an outer sleeve;
   a bar pin including first and second opposing ends;
   an elastomeric bushing disposed between the outer sleeve and the bar pin; and
   a monolithic, one-piece bracket including a U-shaped body, the body including a first leg spaced apart from a second leg, the first and second legs being interconnected by an end wall, the bracket further including a first flange radially extending from the first leg and a second flange radially extending from the second leg, the first and second flanges being coplanar,
   wherein one of the first and second ends of the bar pin is positioned between the first and second legs and secured to the body.

8. The bushing assembly of claim 7, wherein the body includes a first retention member extending from a first side of the first leg toward the second leg and a second retention member extending from a second side of the first leg toward the second leg.

9. The bushing assembly of claim 8, wherein the first and second retention members are arcuate.

10. The bushing assembly of claim 8, wherein the first and second retention members are attached to the one of the first and second ends of the bar pin by crimping.

11. The bushing assembly of claim 8, wherein the first and second retention members extend at least partially around opposing lateral sides of the one of the first and second ends of the bar pin.

12. The bushing assembly of claim 8, wherein the first and second retention members are spaced apart from the second leg.

13. The bushing assembly of claim 8, wherein the first and second retention members are attached to the one of the first and second ends of the bar pin by snap fit.

14. The bushing assembly of claim 13, wherein the first retention member includes a first protrusion extending therefrom and the second retention member includes a second protrusion extending therefrom, the first and second protrusions extend toward each other.

15. The bushing assembly of claim 14, wherein the one of the first and second ends of the bar pin includes first and second lateral sides having first and second grooves, respectively, the first protrusion received in the first groove and the second protrusion received in the second groove to couple the bracket and the bar pin to each other.

16. The bushing assembly of claim 15, wherein the body includes a third retention member extending from a first side of the second leg toward the first retention member and a fourth retention member extending from a second side of the second leg toward the second retention member.

17. The bushing assembly of claim 16, wherein the third retention member includes a third protrusion extending therefrom and the fourth retention member includes a fourth protrusion extending therefrom, the third retention member received in the first groove and the fourth retention member received in the second groove to further couple the bracket and the bar pin to each other.

18. The bushing assembly of claim 7, wherein the end wall is arcuate.

19. The bushing assembly of claim 7, wherein the first and second flanges form a circular shape having a diameter that is greater than a diameter of the elastomeric bushing.

20. The bushing assembly of claim 19, wherein the elastomeric bushing includes an end having a snubber, the first and second flanges spaced apart from the snubber when the elastomeric bushing assembly is in an unloaded condition, the snubber engaging the first and second flanges substantially 360 degrees during a loaded condition to limit the amount of relative travel between the bar pin and the outer sleeve.

* * * * *